United States Patent [19]
Armstrong et al.

[11] Patent Number: 5,697,280
[45] Date of Patent: Dec. 16, 1997

[54] ALL PURPOSE SAW BLADE

[75] Inventors: Donald L. Armstrong, Wheaton, Ill.; Akiyoshi Yoneda, Akasaki; Kunihiko Okada, Himeji, both of Japan

[73] Assignee: Armstrong-Blum Mfg. Co, Mt. Prospect, Ill.

[21] Appl. No.: 594,843

[22] Filed: Jan. 31, 1996

Related U.S. Application Data

[63] Continuation-in-part of Ser. No. 312,732, Sep. 27, 1994, Pat. No. 5,501,129.

[51] Int. Cl.$^6$ ........................................... B27B 33/02
[52] U.S. Cl. ............................ 83/848; 83/851; 83/852
[58] Field of Search ........................ 83/835, 836, 838, 83/844, 848, 849, 850, 851, 852, 661

[56] References Cited

U.S. PATENT DOCUMENTS

| | | |
|---|---|---|
| 1,381,930 | 6/1921 | Morgan . |
| 2,635,327 | 4/1953 | Enlow . |
| 3,651,841 | 3/1972 | Ohlsson . |
| 4,179,967 | 12/1979 | Clark . |
| 4,557,172 | 12/1985 | Yoneda . |
| 4,958,546 | 9/1990 | Yoshida et al. . |
| 5,018,421 | 5/1991 | Lucki et al. . |
| 5,038,653 | 8/1991 | Slocum et al. . |
| 5,361,665 | 11/1994 | Sonefors . |

*Primary Examiner*—Maurina T. Rachuba
*Attorney, Agent, or Firm*—Baker & McKenzie

[57] ABSTRACT

To provide a general-purpose saw blade which will saw different materials cost effectively, the saw blade includes a plurality of sets of teeth, each set including saw tooth having a large relief angle and a small tooth angle which provide fast cutting speeds, and with saw tooth having a small relief angle and a large tooth angle which provide the resistance to chipping.

5 Claims, 4 Drawing Sheets

ALL PURPOSE SAW BLADE

This application is a continuation-in-part of application Ser. No. 08/312,732, filed on Sep. 27, 1994, now U.S. Pat No. 5,501,129.

FIELD OF THE INVENTION

This invention relates generally to saw blades and specifically to a saw blade which embodies the fast cutting characteristics of saw teeth having a large relief angle with the low chipping incidence of saw teeth having relatively smaller relief angles. Although the invention is applicable to band saw blades, circular saw blades and hack saw blades, it will be described as applied to band saw blades.

BACKGROUND OF THE INVENTION

It is well known that cutting speeds can be maximized by employing teeth which have a large relief angle. The disadvantage of using large relief angles however is that the resultant stress on each tooth is so great that chipping occurs with considerable frequency and hence the life of the blade may be quite short, depending of course on other factors such as the type and hardness of material being cut, and also speed, depth and pressure of cut. The high rate of chipping is believed to be traceable to the fact that a saw tooth which has a large relief angle has a comparatively small tooth angle so that the tips of the teeth become weak. A short blade life results not only in frequent replacement of the blade but also substantial downtime, or non-cutting time, to allow for blade replacement. In making an economic assessment of the cost of performing a given job, all of these factors —blade cost, downtime, etc. must be taken into consideration.

It is also known that the frequency of chipping can be reduced and thus the life of the blade increased, and blade change downtime reduced, if a blade is used in which the relief angle of the individual teeth is small. The decreased rate of chipping in such a saw tooth is believed attributable to the presence of a larger tooth angle which increases the strength of the teeth tips. The disadvantage of using a small relief angle however is that the cutting resistance is increased with the result that the speed of cut is much slower, as contrasted to the speed of cut with teeth having large relief angles, for the same job. Again, in making an economic assessment of the cost of performing a given job with teeth having small relief angles, all relevant factors— blade cost, downtime for blade changeover, etc., must be taken into consideration and it is possible that even though blade consumption can be decreased as contrasted to teeth having large relief angles, the additional cutting time offsets these advantages.

It should also be noted that in many shops improper cutting procedures are often employed despite the strenuous educational efforts by management and saw blade manufacturers which attempt to educate blade users on the shop floor to match the blade, together with other factors such as feed rate and pressure, to the job. Thus, for example, hard material should generally be cut at a slower lineal blade speed than softer material. However, resetting of a saw's operating functions each time a sawing job is required is a time-consuming task which requires a skill level and attention to detail which is lacking in many shops. This is particularly true in small shops which have short runs on different materials as contrasted to high-production shops which may have sufficiently long runs on the same material to justify the extra effort and care required to match the saw conditions to the job on a job-by-job basis. Thus, in many small shops the same sawing parameters are used from job to job, including blade, speed, pressure, etc. As a consequence, over a period of time sawing operations are not performed as cost effectively as they could be if the sawing parameters more closely matched the sawing requirements.

There is thus a need for a general-purpose saw blade which will saw different materials cost effectively; that is, a single saw blade which combines, or substantially combines, the fast cutting speeds inherent in saw teeth having large relief angles and small tooth angles, with the resistance to chipping which characterizes saw teeth having a small relief angle and a large tooth angle.

SUMMARY OF THE INVENTION

It is an object to the present invention to provide a general-purpose saw blade which will saw different materials cost effectively.

According to the invention, a single saw blade combines, or substantially combines, the fast cutting speeds inherent in saw teeth having large relief angles and small tooth angles, with the resistance to chipping which characterizes saw teeth having a small relief angle and a large tooth angle.

This saw blade is advantageous in that it can cut both shape steel and solid steel material at a high speed and at a reduced incidence of chipping.

The saw blade according to the invention preferably includes repeating sets of teeth, each set of teeth having a plurality of sub-sets of teeth which differ from every other sub-set in at least one cutting characteristic. Each sub-set may consist of one or more teeth of a given configuration.

Specifically, and with particular reference to a blade in which each set of teeth is composed of seven teeth, the blade of this invention may consist of a sub-set having one or more straight teeth, another sub-set having two or more primary cutting teeth, and another sub-set containing two or more secondary cutting teeth. For convenience of description a blade will be described which consists of a single straight tooth, two primary cutting teeth, one a left-sided tooth and the other a right-sided tooth, and four secondary cutting teeth, two being left sided and two being right sided, the left sided and right sided teeth in this sub-set being located in alternative order. It will be understood that not only may the number of teeth in each sub-set be varied but the order of the sub-sets may be varied. However, for ease of understanding and convenience of description the sub-sets of teeth will be described as related one to the other in the order mentioned immediately above.

For further ease of understanding it will be assumed that the primary cutting teeth have a configuration which is generally, though not exactly, illustrated in U.S. Pat. No. 5,018,421 and the secondary cutting teeth have a configuration which is generally, though not necessarily exactly, similar to the cutting teeth on an existing saw blade in which all teeth have an identically large relief angle.

The single straight tooth, which will hereafter be referred to as S, has neither a leftward nor rightward configuration, but it has a relief angle of less than 30 degrees and, preferably, a relief angle which lies in the range of from about 15 degrees to about 30 degrees. Within this broad range a favorable range is about 15 degrees to about 25 degrees. For purposes of description a relief angle of about 23 degrees will be used since this angle represents the angle used in cutting tests which demonstrate the benefits of the invention.

The tooth angle of the straight tooth should be less than 68 degrees. Within this broad range an optimal range has been found to be from about 55 degrees to about 68 degrees. For purposes of description a tooth angle of 59.5 degrees will be used since this angle represents the angle used in cutting tests which demonstrate the benefits of the invention.

The rake angle of the straight tooth is preferably less than 10 degrees and most preferably in the range of 7 degrees–10 degrees. For purposes of description a rake angle of 7.5 degrees will be used since this angle represents the angle used in cutting tests which demonstrate the benefits of the invention.

The primary cutting teeth, which will hereafter be referred to as $L_1$ and $R_1$ and which have a leftward configuration and a rightward configuration, respectively, when viewed in the cutting direction from the top of the blade, have a relief angle of less than 30 degrees, and preferably a relief angle which lies in the range of from about 15 degrees to about 25 degrees. For purposes of description a relief angle of about 23 degrees will be used since this angle represents the angle used in cutting tests which demonstrate the benefits of the invention.

The tooth angle of the primary cutting teeth $L_1$ and $R_1$ should be less than 68 degrees. Within this broad range, an optimal range is from about 55 degrees to about 68 degrees. For purposes of description, a tooth angle of about 59.5 degrees will be used since this angle represents the angle used in cutting tests which demonstrate the benefits of the invention.

The rake angle of the primary cutting teeth $L_1$ and $R_1$ is preferably less than 10 degrees, and most preferably in the range of from about 7 degrees to about 10 degrees. For purposes of description, a rake angle of 7.5 degrees will be used since this angle represents the angle used in cutting tests which demonstrate the benefits of the invention.

The secondary cutting teeth, which will hereafter be referred to as $L_2$, $R_2$, $L_3$, $R_3$, and which have a leftward configuration and a rightward configuration, respectively, when viewed in the cutting direction from the top of the teeth, have a relief angle of over 30 degrees and preferably a relief angle on the order of about 32 degrees. The tooth angle of the secondary cutting teeth is on the order of about 48 degrees. Since accepted tooth design suggests that the sum of the tooth angle, the relief angle and the rake angle should be 90 degrees, it will be appreciated that the rake angle should be about 10 degree.

In addition, the shape, that is, a side view, of the straight tooth and the primary cutting tooth may be either straight or curved. A curved shape will result in a slightly larger mass of material behind the tooth tip and hence a somewhat stronger tooth tip.

It should be noted that although the relief angle of the primary cutting teeth $L_1$, $R_1$ and the relief angle of the straight tooth S may be identical, it is also feasible and desirable that the relief angle of the primary cutting teeth be smaller than the relief angle of the straight tooth, and that the relief angles of both the straight tooth and the primary cutting teeth be less than the relief angle of the secondary cutting teeth.

Although the order of the sub-sets may be varied, it is preferable that they be arranged in the order of S, $L_1$, $R_1$, $L_2$, $R_2$, $L_3$, $R_3$. It should also be noted that although the relief angle of the primary cutting teeth $L_1$, $R_1$ and the relief angle of the straight tooth S may be identical, it is also feasible and desirable that the relief angle of the primary cutting teeth be smaller than the relief angle of the straight tooth, and that the relief angles of both the straight tooth and the primary cutting teeth be less than the relief angle of the secondary cutting teeth.

It is further preferable that all the teeth S, $L_1$, $R_1$, $L_2$, $R_2$, $L_3$, $R_3$ have the same height. This arrangement is advantageous in that it can cut a material accurately and the resultant cut surface is smooth.

In addition, the shape, that is, a side view, of the straight tooth and the primary cutting tooth may be either straight or curved. A curved shape will result in a slightly larger mass of material behind the tooth tip and hence a somewhat stronger tooth tip.

Another preferable saw blade in accordance with the present invention includes a first sub-set having one or more first straight teeth, a second sub-set having one or more first inclined cutting teeth, a third sub-set having one or more second inclined teeth, a fourth sub-set having one or more second straight teeth, a fifth sub-set having one or more third inclined teeth, and a sixth sub-set having one or more fourth inclined teeth.

This saw blade is advantageous in that during cutting, a feeding direction of the saw blade relative to a material is hardly deviated from a desirable plane; in other words, it is easy to prevent the cutting deviation of the saw blade as described in U.S. Pat. No. 4,355,555 from occurring during feeding of the saw blade in a material.

BRIEF DESCRIPTION OF THE DRAWING

The invention is illustrated more or less diagrammatically in the accompanying drawings wherein.

DETAILED DESCRIPTION OF THE INVENTION

Figure 1:
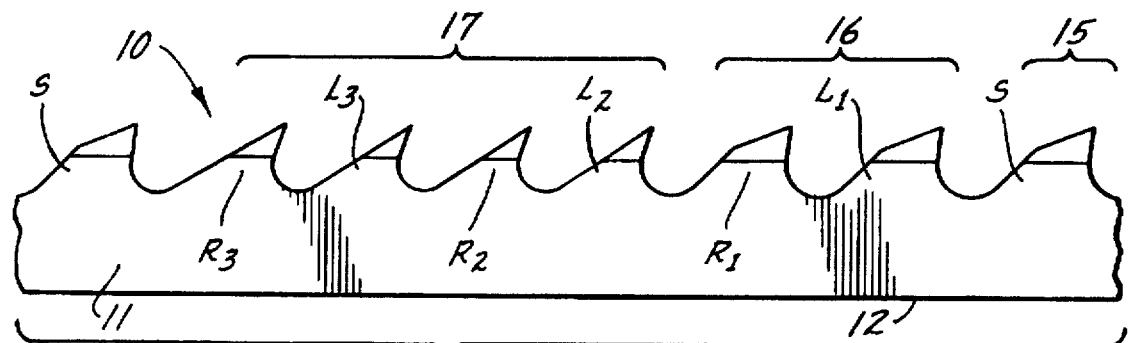
FIG. 1 is a side view of a set of teeth in a saw blade of the present invention, said set including three sub-sets S, and $L_1$,$R_1$, and $L_2$, $R_2$, $L_3$, $R_3$.

Like reference numbers will be used to refer to like or similar parts from Figure to Figure in the drawing.

The unique saw blade of this invention is indicated generally at 10 in FIG. 1. The saw blade includes a body, indicated at 11, having an edge 12 which in this instance is lineal in contour. The saw blade may be formed of any suitable material which has heretofore been used for saw blades and may be of a conventional width or thickness.

The front or working edge of the saw blade is composed of a plurality of teeth which are here designated as S, $L_1$, $R_1$, $L_2$, $R_2$, $L_3$ and $R_3$. The seven teeth just identified form a set 13 of teeth as is indicated by the appearance of a second tooth S which appears at the left of the diagram to signify the start of a second, duplicate set to the set just described.

The set 13 consists of, in this instance, three sub-sets of teeth, the sub-sets being (1) S, (2) $L_1$, $R_1$ and (3) $L_2$, $R_2$, $L_3$, $R_3$, and denominated as sub-sets 15, 16 and 17 respectively.

Figure 2:
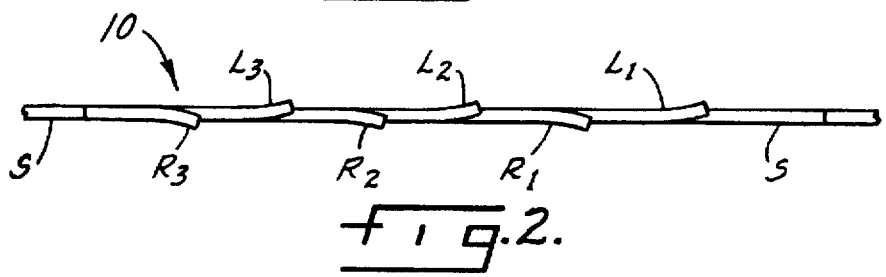
FIG. 2 is a top view of a set of teeth in a saw blade of the present invention.

Sub-set 15 will hereafter sometimes be referred to as the straight tooth or the straight tooth sub-set; sub-set 16 will hereafter sometimes be referred to as the primary cutting teeth sub-set; and sub-set 17 will hereafter sometimes be referred to as the secondary cutting teeth sub-set. Reference letter S stands for "straight", and the reference letters L and R indicate skewed or angled orientation of the tooth tip with respect to the Cutting Direction as a reference line. Thus, reference letter $L_1$ stands for the first left-angled cutting tooth, reference letter $R_1$ stands for the first right-angled cutting tooth, reference letter $L_2$ stands for the second left-angled cutting tooth and so on. The basis for the straight, left and right designations becomes apparent from FIG. 2 which is a plan view of the front or working edge of the saw blade. Thus the tooth tip of the S tooth is aligned with the body 11 of the saw blade 10 and projects to neither one side or the other when viewed as in FIG. 2. The tooth tip of the next tooth, $L_1$, is so configured that a projection of the tooth tip into the plane of the paper lies to the left of the body 11. The tooth tip of the next tooth, $R_2$, is so configured that a projection of the tooth tip into the plane of the paper lies to the right of the body 11, and so on through $R_3$.

Figure 3:
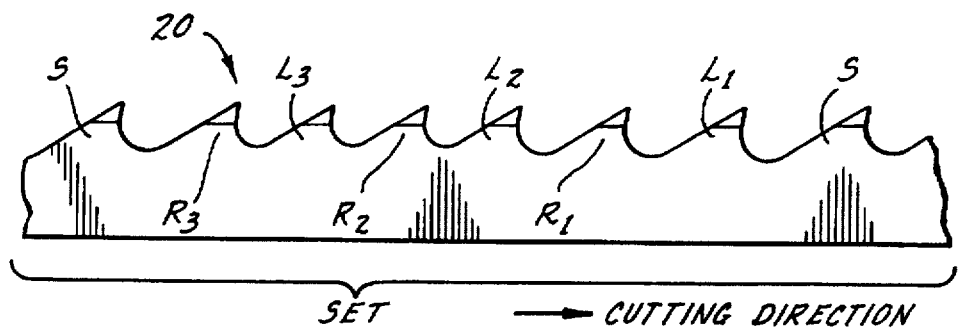
FIG. 3 is a side view of a prior art saw blade which utilizes a large relief angle and in which all teeth configuration are similar, said teeth having straight and leftward and rightward orientations as indicated by the base letter designations S, L and R.

The difference between the saw blade of this invention and the prior art is highlighted by a comparison of FIG. 1 with the prior art saw blade 20 shown in FIG. 3. Although the teeth tips of S, $L_1$, $R_1$, $L_2$, $R_2$, $L_3$ and $R_3$ of the prior art saw blade 20 may have straight and left and right configurations, all teeth are identical in shape in side view and thus provide no basis for a classification of the kind indicated at 15, 16 and 17 in FIG. 1 except the characteristic of deviation from the Cutting Direction 18. In this instance the prior art teeth of FIG. 3 have a large relief angle and thus are of the type of teeth having excellent cutting action, but an unacceptably high incidence of chipping.

Figure 4:
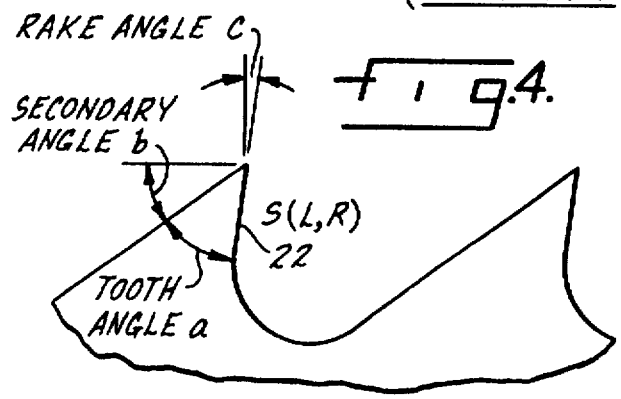
FIG. 4 is a diagrammatic representation of a tooth profile illustrating the tooth angle, the relief or secondary angle and the rake angle.

An understanding of the concept underlying this invention can be better appreciated from the general tooth geometry diagram of FIG. 4. The tooth angle is indicated at a and the relief or secondary angle is indicated at b. The rake angle, which is the angle between a vertical line passing through the tooth tip and a line which represents the projection of the tooth face 22, is indicated at c. As is known, the relationship between the cutting tooth's (a) tooth angle, (b) relief angle and (c) rake angle is standardized at 90 degrees. Therefore, unless the rake angle is drastically altered, the tooth angle will increase when the relief angle becomes smaller, and the tooth angle will increase when the relief angle becomes larger. Thus, generally speaking, teeth-tip strength increases when the relief angle is decreased. As the relief increases, the teeth tip can penetrate the material and the cutting ability is increased. However, as mentioned earlier, an increase in the cutting ability results in a much higher incidence of tooth chipping, and thereby a shortening of the useful life of the saw blade. Conversely, when the relief angle is smaller and tooth tip strength is increased, the useful life of the blade is extended, albeit at a decrease in penetration and cutting ability.

Referring again to FIG. 1 it will be noted that the teeth of sub-set 15 (i.e.; tooth S) and sub-set 16 (i.e., $L_1$ and $R_1$) have substantially or exactly the same relief angle. As mentioned above, this relief angle of sub-sets 15 and 16 is less than 30 degrees and preferably in the range of about 15 degrees to about 25 degrees. A relief angle of 23 degrees has been found to be very satisfactory.

It should be understood that although FIG. 1 indicates that the relief angle of S and $L_1$, $R_1$, are substantially equal, the relief angles of these two sub-sets need not be. If the relief angles are dissimilar it is preferred that the relief angle of sub-set 16 be less than the relief angle of sub-set 15.

The relief angles of sub-set 17, by contrast to the relief angles of sub-sets 15 and 16, are substantially greater; an angle of over 30 degrees is preferred of which an angle of 32 degrees has been found to be very satisfactory.

It should also be noted that tooth angles, i.e.: angle a of the first and second sub-sets i.e., S and $L_1$, $R_1$, should be less than 68 degrees and preferably in the range of from about 55 degrees to 68 degrees of which an angle of about 59.5 degrees has been found to be very satisfactory. By the same token, the tooth angle a of sub-set 17 i.e. $L_2$, $R_2$, $L_3$, $R_3$, should be about 48 degrees. And further, the rake angle of sub-sets 15 and 16 should be less than 10 degrees of which 7 degrees to 10 degrees is a preferred range. Within this range an angle of 7.5 degrees has been found to be very satisfactory. The rake angle of sub-set 17 may be of the same magnitude or slightly greater.

The unexpectedly excellent results which flow from the use of a set of teeth containing sub-sets 15, 16 and 17 are illustrated in FIGS. 5-10.

Figure 5:
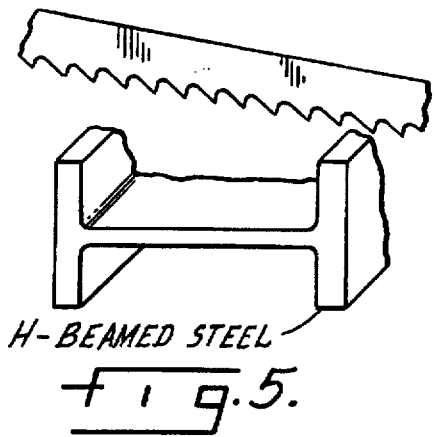
FIG. 5 is a diagrammatic view of a cutting test of the saw blade of the invention which was performed on a structural shape, here an H-beam.

In a first test a structural shape, and specifically a steel H-beam, was cut as indicated in FIG. 5.

Figure 6:
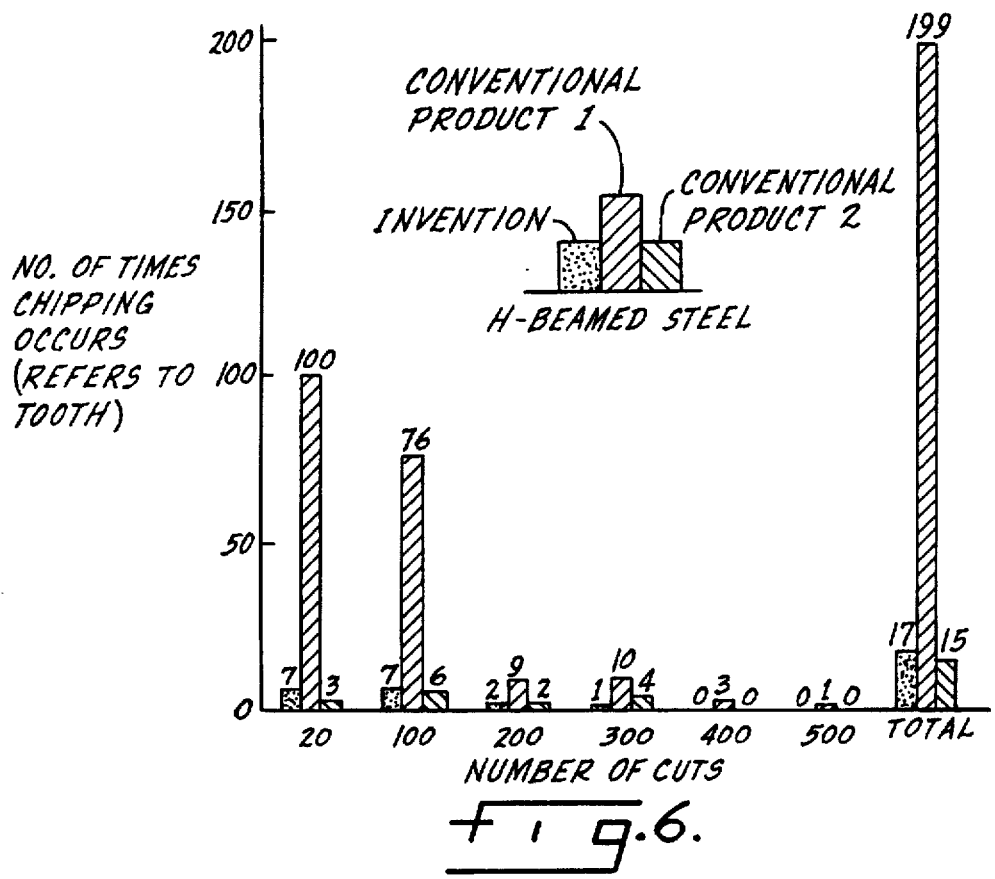
FIG. 6 is a bar graph showing the number of chips per cut of two conventional blades and the invention blade after the same number of cuts.

Three tooth configurations were tested. A first band saw blade was composed of teeth having a large relief angle, such as illustrated in FIG. 3. A second band saw blade was composed of teeth conforming to the disclosure in U.S. Pat. No. 508,421. A third saw blade was composed as indicated in FIG. 1; that is, a number of identical sets of teeth were formed in the band saw, each set being composed of three sub-sets 15, 16 and 17. A steel H-beam as illustrated in FIG. 5 was the test material. The results are shown in FIG. 6 which is a bar graph illustrating the number of teeth which were chipped after 20, 100, 200, 300, 400 and 500 cuts for each of the three blades. As seen from the "Total" bars, a total of 17 chipped teeth of the invention blade occurred after 500 cuts; a total of 15 chipped teeth occurred in the conventional product 2 of U.S. Pat. No. 5,018,521 and a total of 199 chipped teeth occurred in the conventional product 1 which is represented by the configuration shown in FIG. 3.

From the above it will be noted that the invention saw blade was very nearly the equal of conventional product 1, and far superior to conventional product 2.

Figure 7:
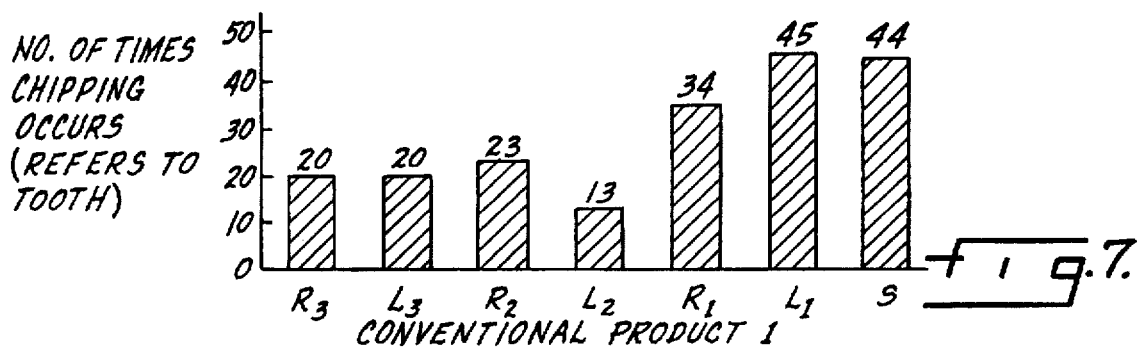
FIG. 7 is a bar graph showing the number of chips which occur in each tooth in conventional product 1, said teeth, being denominated S, $L_1$, $R_1$, $L_2$, $L_3$ and $R_3$, after the cuts which are totaled in FIG. 6.
Figure 8:
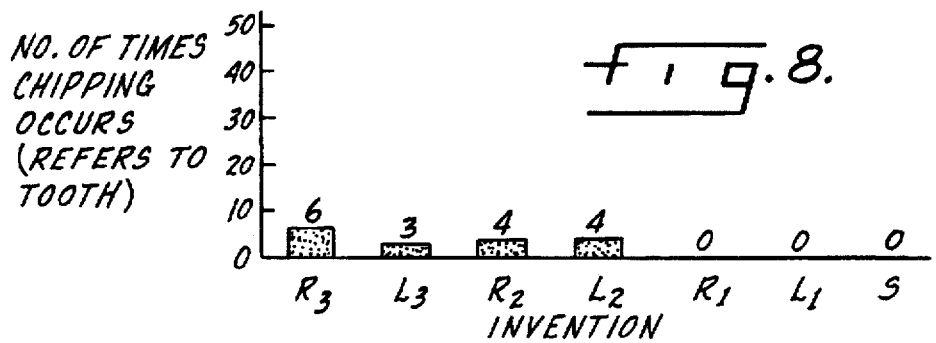
FIG. 8 is a bar graph showing the number of chips which occur in each tooth in the invention blade after the cuts which are totaled in FIG. 6.

A more detailed analysis of specific tooth chipping which occurred on the basis of location within the set of teeth is illustrated in FIGS. 7 and 8.

From FIG. 7 it will be seen that tooth S and teeth $L_1$, $R_1$ in conventional product 1 experienced substantial chipping;

indeed these three teeth accounted for 62% of all chipped teeth whereas the trailing four teeth, $L_2$, $R_2$, $L_3$, and $R_3$ accounted for only 38% of the total number of chipped teeth.

The benefit of the invention tooth set is dramatically illustrated in FIG. 8 which shows that the three lead teeth of the invention, S, $L_1$, $R_1$ experienced no chipping whatsoever as contrasted to 123 chipped teeth in conventional product 1 for the same number of cuts on the same test piece.

Figure 9:
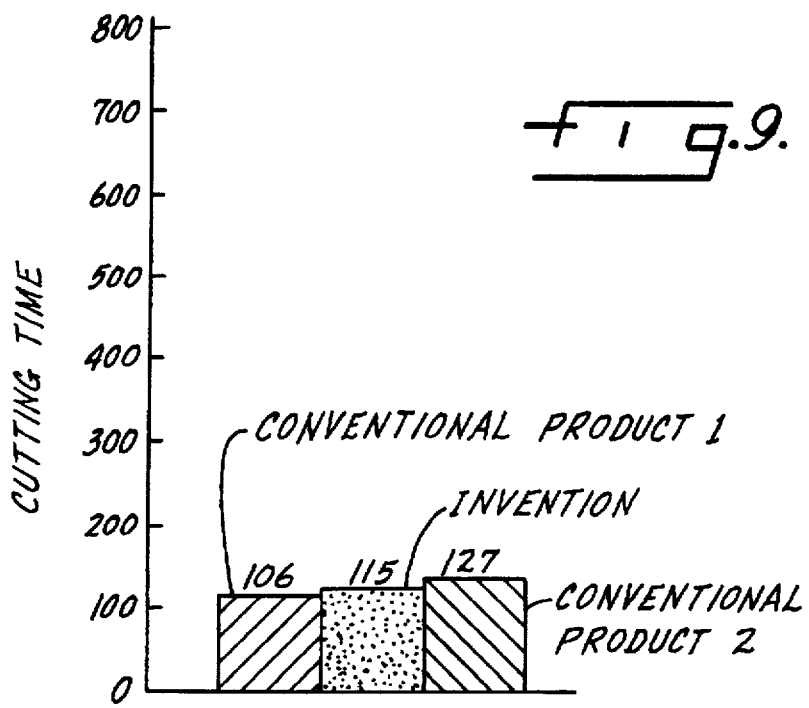
FIG. 9 illustrates the time required to cut a 150mm circular bar of 45C by two conventional blades and the blade of this invention.
Figure 10:
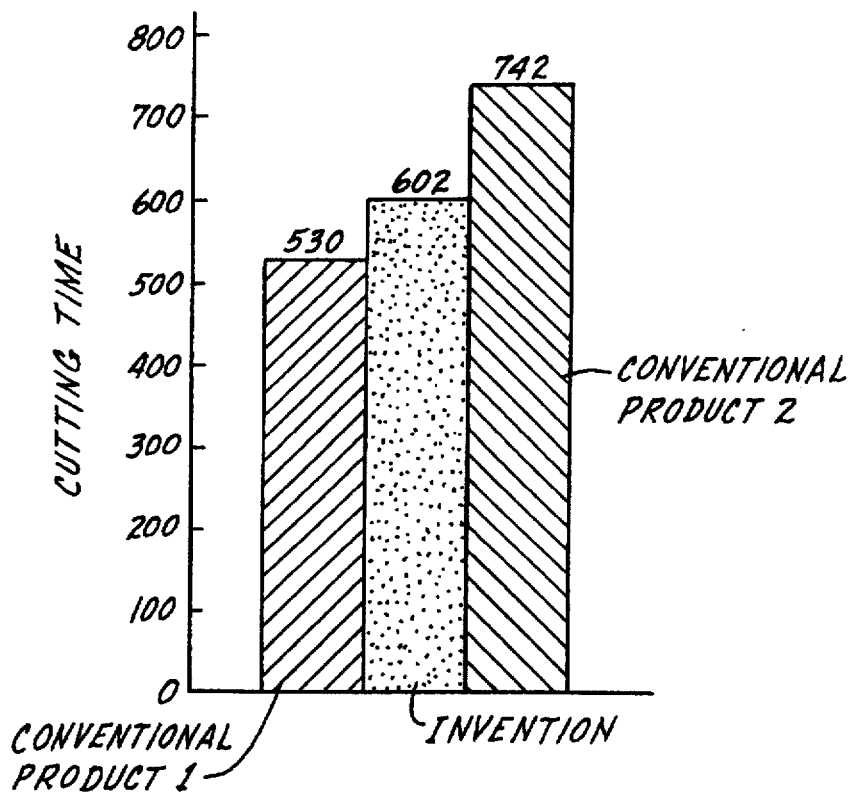
FIG. 10 illustrates the time required to cut a 150mm circular bar of SUS304 by two conventional blades and the blade of this invention.

The speed of cut of the teeth constituting the teeth of the invention as contrasted to the other two conventional teeth configurations are illustrated in FIGS. 9 and 10.

High-speed cutting materials were used in the two separate tests represented by FIGS. 9 and 10.

In the second test the speed of cut of the teeth constituting the teeth of the invention as contrasted to the other two conventional teeth configurations was examined, as illustrated in FIGS. 9 and 10. For this purpose, a solid circular bar was cut since for such solid bar, the cutting resistance is generally large and the speed of cut is slow.

A solid circular bar of 150mm diameter of S45C was specifically used in the test whose results are set out in FIG. 9. The teeth configuration of the invention resulted in a cutting speed which was only about 8.5% slower than the fast cutting configuration of conventional steel 1, but was approximately 10% faster than the low chipping configuration of conventional tooth configuration.

A primary circular bar of 150mm diameter of S45C was used in the test whose results are set out in FIG. 9. The teeth configuration of the invention resulted in a cutting speed which was only about 8.5% slower than the fast cutting configuration of conventional steel 1, but was approximately 10% faster than the low chipping configuration of conventional tooth configuration 2.

From FIG. 10 it will be understood that, when utilizing a 150mm circular bar of SUS304 material, the invention configuration was about 13.5% slower than the fast cutting configuration of conventional steel 1 but about 23.5% faster than the configuration of conventional product 2.

Figure 11:
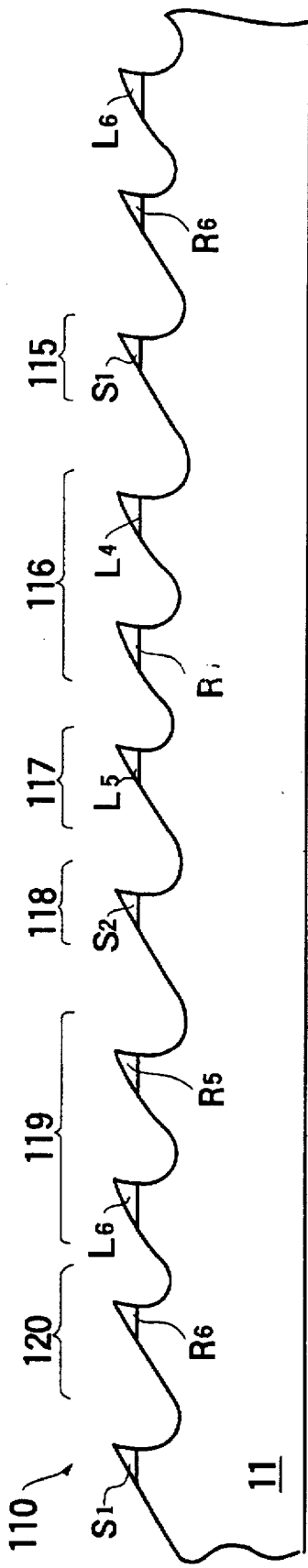
FIG. 11 is a side view of set of teeth in a second embodiment of a saw blade of the present invention, said set including six sub-sets $S_1$, and $L_4$, $R_4$, and $L_5$, and $S_2$, and $R_5$, $L_6$, and $R_6$.
Figure 12:
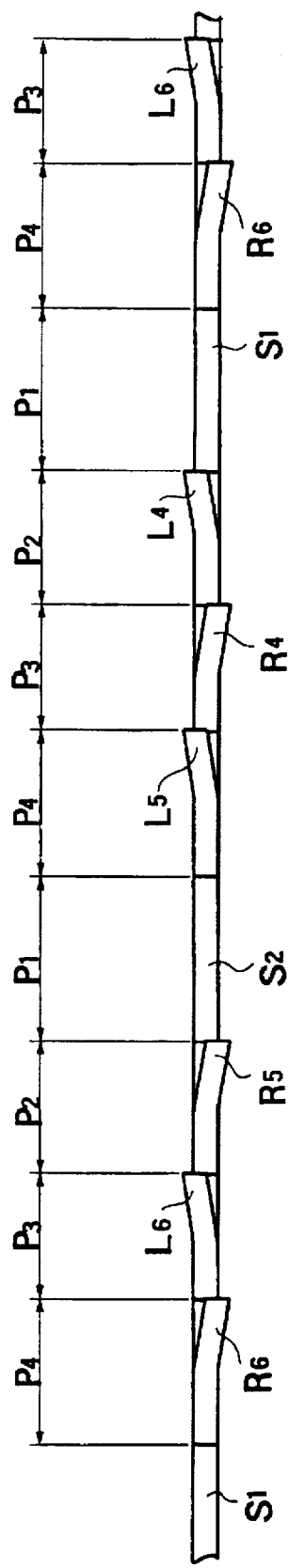
FIG. 12 is a top view of a set of teeth in a saw blade as illustrated in FIG. 11.

A second embodiment of the saw blade of the present invention is indicated generally at 110 in FIG. 11. The front or working edge of the second embodiment is composed of a plurality of teeth which are designated as $S_1$, $L_4$, $R_4$, $L_5$, $S_2$, $R_5$, $L_6$, $R_6$. The eight teeth form a set 113 of teeth.

The set 113 of the second embodiment consists of six sub-sets of teeth, the sub-sets being (1) $S_1$, (2) $L_4$, $R_4$, (3) $L_5$, (4) $S_2$, (5) $R_5$, $L_6$, and (6) $R_6$, and denominated as sub-sets 115, 116, 117, 118, 119, 120 respectively.

It will be noted that the teeth of sub-set 116 (i.e., teeth $L_4$, $R_4$) and sub-set 119 (i.e., $R_5$, $L_6$) have substantially or exactly the same relief angle. This relief angle of the sub-sets 116 and 119 is less than 30 degrees and preferably in the range of from about 15 degrees to about 25 degrees. A relief angle of 25 degrees has been found to be very satisfactory.

The relief angles of sub-sets 115, 117, 118, 120, by contrast to the relief angles of sub-sets 116 and 119, are substantially greater; the relief angle is greater than 30 degrees and preferably in the range of from about 32 degrees to 35 degrees.

The rake angle, i.e. angle c of the teeth $S_1$, $L_4$, $R_4$, $L_5$, $S_2$, $R_5$, $L_6$, $R_6$, are all the same and should be less than about 7 degrees.

Further, the tooth angle of sub-sets 116 and 119 should be in the range of from about 58 degrees to about 65 degrees, and the tooth angle of the sub-sets 115, 117, 118, 120 should be in the range of from about 48 degrees to 55 degrees.

It should be noted that in the second embodiment, two straight teeth $S_1$, and $S_2$ are provided in a single set 113, so that it is unlikely that the saw blade deviates in the lateral direction during cutting. This in turn means that during feeding of the saw into the material, a possible lateral deviation of the saw blade relative to a material is prevented from occurring.

With the second embodiment, both shape steel and solid steel material can also be cut at the high speed and at the reduced incidence of chipping as in the first embodiment.

It will thus be seen that when both chipping and time of cutting are considered, the tooth configuration of this invention gave markedly better all around performance which translates into more cost-efficient cutting for both low volume and high production jobs at the saw.

It will thus be seen that the invention provides a saw blade capable of cutting both standardized, solid-shaped steel materials at a speed very comparable to the fastest cutting speeds achieved by current tooth configurations but at a dramatically reduced incidence of chipping. As a result, an economical, general purpose saw blade has been provided which is cost efficient for both high production and low production operations. This result is achieved by a saw blade formed with cutting teeth which have a relatively small relief angle and a relatively large tooth angle which enables the teeth to maintain tip strength and increase penetration.

Although a specific description of the invention has been set out above, it will be understood that variations may be made within the spirit and scope of the invention. Accordingly, it is intended that the invention not be limited by the foregoing exemplary description but only by the scope of the hereafter appended claims when interpreted in light of the relevant prior art.

We claim:

1. In a saw blade,
   a set of teeth, said set of teeth including
   a first sub-set which includes a straight tooth,
   a second sub-set which includes at least one left-angled tooth and one right-angled tooth,
   a third sub-set which includes at least one of a left-angled tooth and a right-angled tooth,
   a fourth sub-set which includes a straight tooth,
   a fifth sub-set which includes at least one left-angled tooth and one right-angled tooth,
   a sixth sub-set which includes at least one of a left-angled tooth and a right-angled tooth,
   heights of all the teeth being substantially the same, and the relief angles of the teeth in the second sub-set and the fifth sub-set, which are substantially the same being smaller than the relief angles of the teeth in either the first, third, fourth, sixth sub-sets.

2. The saw blade of claim 1, wherein the relief angles of the first, third, fourth, and sixth sub-sets are all substantially the same.

3. In a saw blade,
   a set of teeth, said set of teeth including
   a first sub-set which includes a straight tooth,
   a second sub-set which includes at least one left-angled tooth and one right-angled tooth,
   a third sub-set which includes at least one left-angled tooth or one right-angled tooth,
   heights of all the teeth being substantially the same, and the relief angles of the teeth in the second sub-set being smaller than the relief angles of the teeth in the first and third sub-sets.

4. The saw blade of claim 3, wherein the relief angle of the teeth in the first sub-set is substantially equal to the relief angle of the teeth in the third sub-set.

5. In a saw blade,
- a set of teeth, said set of teeth including
- a first sub-set which includes a straight tooth,
- a second sub-set which includes at least one left-angled tooth and one right-angled tooth,
- a third sub-set which includes at least one left-angled tooth or one right-angled tooth,
- wherein the sub-sets are arranged in the order of first sub-set, second sub-set, and then third sub-set, and the relief angles of the teeth in the second sub-set is smaller than the relief angles of the teeth in the first and third sub-sets.

* * * * *